(12) United States Patent
Enoyoshi et al.

(10) Patent No.: US 6,640,777 B2
(45) Date of Patent: Nov. 4, 2003

(54) METHOD AND DEVICE FOR CONTROLLING FUEL INJECTION IN INTERNAL COMBUSTION ENGINE

(75) Inventors: Masahiko Enoyoshi, Shuuchi-gun (JP); Shiro Asaeda, Shuuchi-gun (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 64 days.

(21) Appl. No.: 09/682,595

(22) Filed: Sep. 25, 2001

(65) Prior Publication Data

US 2002/0043246 A1 Apr. 18, 2002

Related U.S. Application Data

(63) Continuation-in-part of application No. 09/682,457, filed on Sep. 5, 2001.

(30) Foreign Application Priority Data

Oct. 12, 2000 (JP) .................................. 2000-311790
Dec. 14, 2000 (JP) .................................. 2000-379748

(51) Int. Cl.⁷ .............................................. F02D 41/30
(52) U.S. Cl. ................... 123/406.24; 123/436
(58) Field of Search ..................... 123/406.18, 406.23, 123/406.24, 406.25, 406.32, 406.5, 406.51, 436, 492, 493, 494; 701/104, 105, 110

(56) References Cited

U.S. PATENT DOCUMENTS

| 3,870,869 A | 3/1975 | Eberle et al. |
| 3,969,614 A | 7/1976 | Moyer et al. |
| 4,197,767 A | 4/1980 | Leung |
| 4,276,600 A | 6/1981 | Hartford et al. |
| 4,291,383 A | 9/1981 | Tedeschi et al. |
| 4,301,678 A | 11/1981 | Full et al. |
| 4,309,759 A | 1/1982 | Tokuda et al. |
| 4,309,971 A | 1/1982 | Chiesa et al. |
| 4,380,800 A | 4/1983 | Wilkinson |
| 4,383,440 A | * 5/1983 | Murata ........................ 73/117.3 |
| 4,403,584 A | 9/1983 | Suzuki et al. |
| 4,433,381 A | 2/1984 | Wilkinson |
| 4,483,184 A | 11/1984 | Kunzfeld |

(List continued on next page.)

FOREIGN PATENT DOCUMENTS

| EP | 0893591 | * 1/1999 | ........... F02D/37/02 |
| GB | 2196153 | 4/1988 | |
| GB | 2237388 | 5/1991 | |
| GB | 5313200 | 11/1997 | |
| JP | 265442 | * 9/1992 | ........... F02D/41/22 |
| JP | 226367 | * 9/1996 | ............. F02P/5/15 |

OTHER PUBLICATIONS

Development of a Low–Cost Fuel Injection System For Use on Small Utility Engines, SAE 1999–01–3292/JSAE9938047, pp. 360–367, Paul M. Gartner, Copyright 1999 Society of Automotive Engineers, Inc.

*Primary Examiner*—Henry C. Yuen
*Assistant Examiner*—Hai Huynh
(74) *Attorney, Agent, or Firm*—Ernest A Beutler

(57) ABSTRACT

An improved method and system for the control of an engine fuel injection system. The control senses the speed variations either during a portion of a complete cycle and a complete cycle and/or from cycle to cycle in order to determine the load on the engine from preprogrammed maps based upon the engine characteristics. From this load and the speed reading, it is possible to obtain the desired engine fuel injection control. This not only reduces the costs of the system by reducing the number of sensors, but also permits adjustments to be made more rapidly.

34 Claims, 11 Drawing Sheets

U.S. PATENT DOCUMENTS

| | | |
|---|---|---|
| 4,532,592 A | 7/1985 | Citron et al. |
| 4,581,703 A * | 4/1986 | Bassi et al. ................. 701/105 |
| 4,590,563 A | 5/1986 | Matsumura et al. |
| 4,697,561 A | 10/1987 | Citron |
| 4,715,009 A * | 12/1987 | Bohmler et al. ............ 702/147 |
| 4,725,955 A | 2/1988 | Kobayashi et al. |
| 4,765,306 A * | 8/1988 | Scarnera et al. ............ 123/643 |
| 4,814,997 A | 3/1989 | Matsumura et al. |
| 4,829,440 A | 5/1989 | Abe |
| 4,840,245 A | 6/1989 | Kamei et al. |
| 4,870,586 A | 9/1989 | Asakura et al. |
| 4,879,656 A | 11/1989 | Quigley et al. |
| 4,884,547 A | 12/1989 | Tamura |
| 4,887,216 A | 12/1989 | Ohnari et al. |
| 4,893,600 A | 1/1990 | Holmes |
| 4,911,128 A | 3/1990 | Hara et al. |
| 4,924,831 A | 5/1990 | Piteo et al. |
| 4,941,445 A * | 7/1990 | Deutsch ................. 123/406.18 |
| 4,947,808 A * | 8/1990 | Kawamura ............. 123/145 A |
| 4,951,206 A | 8/1990 | Kyohzuka |
| 4,972,818 A * | 11/1990 | Nomura et al. ........ 123/406.13 |
| 4,991,102 A | 2/1991 | Sakamoto et al. |
| 5,021,956 A | 6/1991 | Yoshimura et al. |
| 5,021,959 A | 6/1991 | Jundt et al. |
| 5,047,943 A * | 9/1991 | Takahata et al. ............ 701/101 |
| 5,099,429 A | 3/1992 | Onari et al. |
| 5,121,324 A | 6/1992 | Rini et al. |
| 5,165,271 A * | 11/1992 | Stepper et al. ................ 73/116 |
| 5,184,589 A | 2/1993 | Nonaka |
| 5,191,531 A | 3/1993 | Kurosu et al. |
| 5,218,945 A | 6/1993 | Kapellen et al. |
| 5,231,966 A * | 8/1993 | Yoshida et al. ............. 123/436 |
| 5,249,130 A | 9/1993 | Mamiya et al. |
| 5,278,762 A | 1/1994 | Kawamura |
| 5,284,116 A | 2/1994 | Richeson, Jr. |
| 5,341,299 A | 8/1994 | Stellwagon et al. |
| 5,345,817 A | 9/1994 | Grenn et al. |
| 5,392,753 A | 2/1995 | Burson et al. |
| 5,445,014 A | 8/1995 | Fiorenza, II et al. |
| 5,485,382 A | 1/1996 | Seki et al. |
| 5,497,748 A * | 3/1996 | Ott et al. ................. 123/406.6 |
| 5,548,514 A | 8/1996 | Hasegawa et al. |
| 5,566,071 A | 10/1996 | Akazaki et al. |
| 5,575,268 A | 11/1996 | Hirano et al. |
| 5,577,475 A | 11/1996 | Backer et al. |
| 5,629,853 A | 5/1997 | Ogawa et al. |
| 5,672,817 A | 9/1997 | Sagisaka et al. |
| 5,684,248 A | 11/1997 | Iwata |
| 5,970,784 A * | 10/1999 | Genin ....................... 73/117.3 |
| 5,988,140 A | 11/1999 | Gartner et al. |
| 6,218,799 B1 * | 4/2001 | Hori ........................... 318/446 |
| 6,230,687 B1 * | 5/2001 | Marca ........................ 123/491 |
| 6,272,425 B1 | 8/2001 | Herndon |
| 6,283,105 B1 * | 9/2001 | Kasai ......................... 123/672 |
| 6,363,912 B1 * | 4/2002 | Flach ......................... 123/436 |
| 6,502,549 B1 * | 1/2003 | Hoshino et al. ....... 123/406.41 |
| 2002/0043245 A1 * | 4/2002 | Enoyoshi et al. ...... 123/406.24 |

\* cited by examiner

METHOD AND DEVICE FOR CONTROLLING FUEL INJECTION IN INTERNAL COMBUSTION ENGINE

CROSS REFERENCE TO RELATED APPLICATIONS

This application is a continuation in part of the copending application entitled "ENGINE CONTROL METHOD AND APPARATUS", Ser. No. 09/682,457, Filed Sep. 5, 2001 and assigned to the assignee hereof.

BACKGROUND OF INVENTION

This invention relates to an engine fuel injection system and control method and more particularly to an improved, simplified, highly effective and yet low cost arrangement for such a system and control.

In internal combustion engines, a wide variety of systems and methodology are employed for engine fuel injection control. Generally, smaller and lower volume engine applications incorporate generally less sophisticated controls than those employed on larger production volume engines such as automotive engines. Even in the small displacement lower production volume engines, for example those used in motorcycles, the engine fuel injection control can become quite complicated.

For example and as shown in FIG. 1, the fuel injection control for a motorcycle engine is shown schematically. The control arrangement is intended to control the timing and duration of fuel injection from a fuel injector 21 associated with an internal combustion engine 22 that powers the motorcycle, which is not shown in this figure, but which may be of a construction as generally shown in FIG. 2. A control signal "i" is applied to the fuel injector 21 that is supplied with fuel from a fuel supply system, indicated generally at 23 by a fuel injection control circuit arrangement, indicated schematically at 24. This fuel injection control circuit arrangement 24 receives the inputs from a number of engine-associated sensors.

These sensors include a crankcase rotational speed sensor 25 which may comprise a pulser coil and a throttle position sensor 26, which is coupled to the throttle control mechanism for the engine 22 for controlling the position of a throttle valve 27 and inputs a signal to the control 24 indicative of engine load and/or operator demand.

Electrical power is provided to the injection control circuit arrangement 24 from a battery 28 through a main switch 29. This battery power is applied to a power source circuit 30 of the fuel injection control circuit arrangement 24 and specifically to an electronic circuit 31 which may comprise a microprocessor.

The output from the engine speed sensor 25 is transmitted to a rotational speed detector circuit 32, which counts the number of pulses generated in a time period so as to determine the rotational speed of the crankshaft of the engine 22.

This outputs a speed signal N to a fuel injection timing and duration (amount) control determining circuit, indicated at 33. In addition, the throttle position sensor 26 inputs a signal to a throttle position detector circuit 34. This detector circuit 34 outputs a signal A to a throttle opening calculating circuit 35. This, in turn, outputs a throttle angle position θ to the fuel injection timing and duration (amount) control circuit 33.

From these inputs, the fuel injection timing and duration (amount) control circuit 33 outputs a signal at times determined from maps contained in a memory of the circuit 31 to an fuel injection timing and duration (amount) control circuit 36 to output a timed electrical output "i" of predetermined length to the fuel injector 21 for operating it in a well-known manner.

Various maps may be incorporated in the circuit 31 and to determine how long and when the fuel injection is varied in response to engine speed for given load as determined by the throttle opening circuit. There may be a family of such curves so as to vary the injection timing and duration in response to both throttle position and engine speed.

The introduced charge is then ignited by a spark plug 37 that is fired in any desired manner including that described in the aforenoted copending application, Ser. No. 09/682457.

Rather than using a throttle position sensor, load may be sensed by intake manifold vacuum. Either method, however, requires added sensors, transducers and circuitry.

It has been found that merely using engine speed and load as detected by something such as a throttle position or intake manifold vacuum sensor does not actually provide as good a control as desired. That is, these two factors by themselves may not be sufficient to provide the desired degree of control.

Although systems have been provided for automotive applications wherein more sophisticated controls are employed, this further adds to the cost of the system and does not always provide the optimum results.

There have also been other devices than throttle position sensors or vacuum sensors for sensing intake manifold vacuum for determining engine load. It also has been determined that engine load may be found by comparing engine speed from one revolution to another. However, these systems also tend to be complicated and do not lend themselves particularly low production volume, low cost vehicle applications. They also have the disadvantage of requiring a plurality of different types of sensors.

Other arrangements have been proposed wherein engine speed is measured for less than one complete revolution of the engine and variations from cycle to cycle have been employed to determine engine load. These systems, however, have for the most part, required multiple sensors and also require some delay from the sensed conditions before adjustment is being made.

It is, therefore, a principal object to this invention to provide an improved engine control system wherein the number of sensors employed for achieving optimum engine fuel injection control is substantially reduced.

It is a further object to this invention to provide an arrangement for controlling an engine fuel injection system utilizing only a single sensor and a single timing mark associated with a driven engine shaft so as to substantially reduce the costs, without significantly decreasing the efficiency or the obtaining of an optimum control.

SUMMARY OF INVENTION

A first feature of this invention is adapted to be embodied in an internal combustion engine fuel injection control system. The engine has a driven shaft and a sensor arrangement is associated with the driven shaft for sensing the instantaneous rotational speed of the driven shaft during the rotation of the driven shaft for less than a complete rotation and for sensing the rotational speed of the driven shaft for a complete revolution that includes the measured less than complete rotation. In accordance with the apparatus, the engine fuel injection system is controlled from these measurements.

Another feature of the invention is adapted to be embodied in a four-cycle internal combustion engine fuel injection control. In accordance with the apparatus, the engine has a driven shaft and a sensor arrangement is associated with the driven shaft for sensing the rotational speed of the driven shaft. The rotational speed of the driven shaft during a revolution containing a compression stroke and during a revolution containing an exhaust stroke is made. The engine fuel injection is controlled from these measurements.

Another feature of the invention is adapted to be embodied in a fuel injections system for an internal combustion engine. The engine has a driven shaft and sensor is associated with the driven shaft for sensing two rotational conditions of the driven shaft during a first rotation thereof. The same two rotational conditions are sensed during the immediately succeeding rotation of the driven shaft and the engine fuel injection system is controlled on the third rotation of the driven shaft from these measurements.

DETAILED DESCRIPTION

Figure 1:
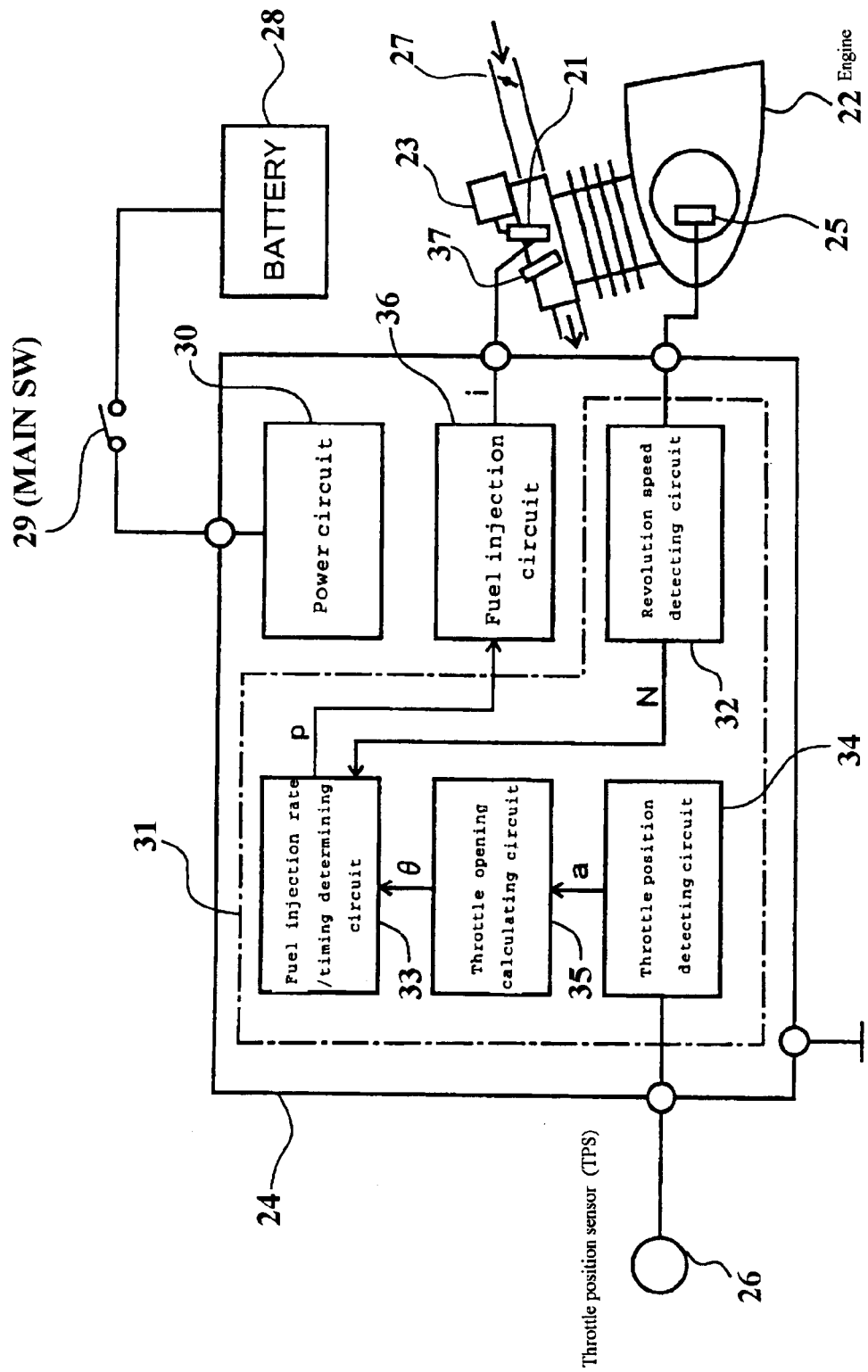
FIG. 1 is a partially schematic view showing a prior art type of engine fuel injection control system.
Figure 2:
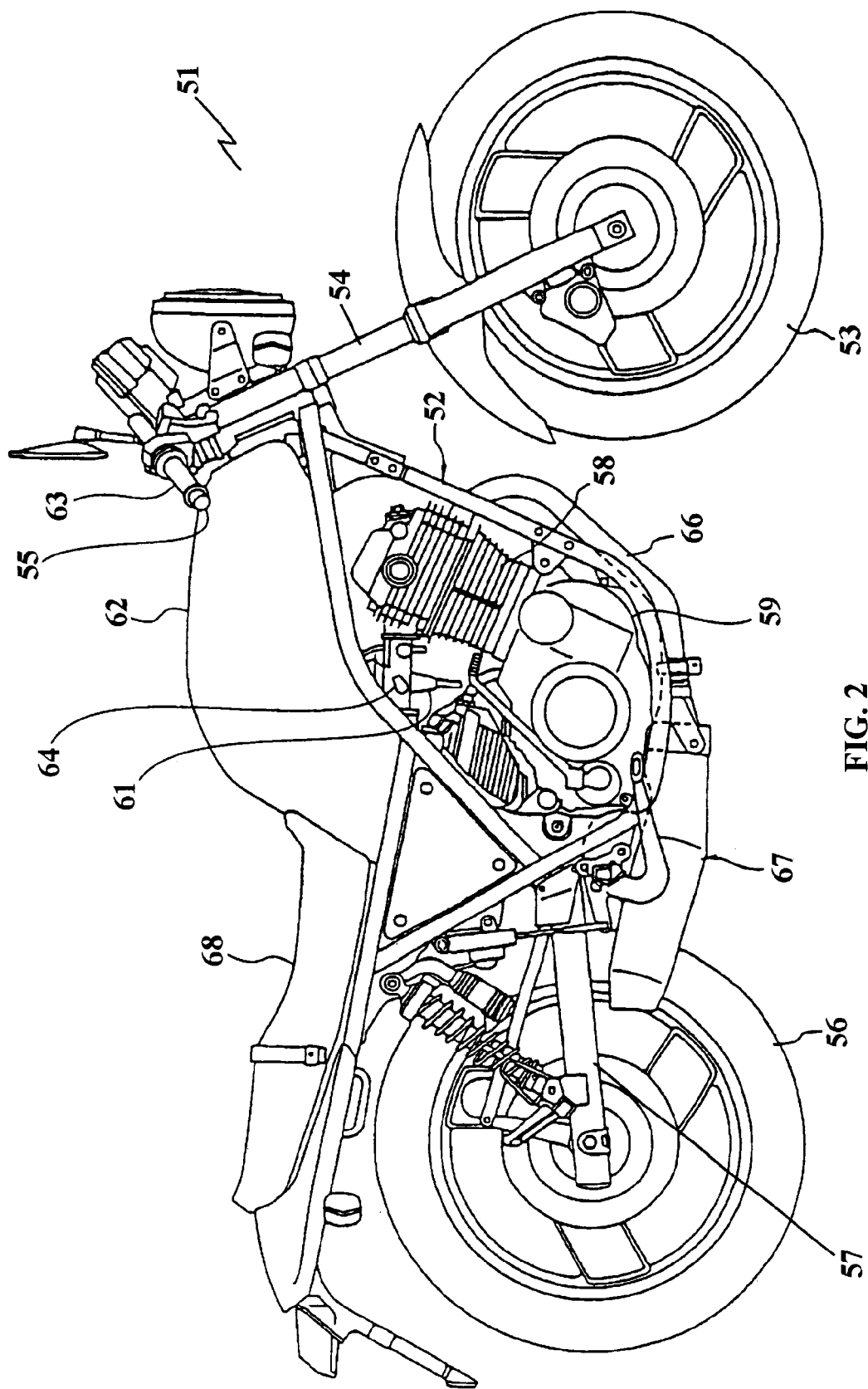
FIG. 2 is a side elevational view of the type vehicle which the prior art system can be utilized and also which can utilize the invention.

Referring now in detail to the drawings and initially to FIG. 2, a motorcycle constructed and operated in accordance with the invention is identified generally by the reference numeral 51. It is to be understood that this specific application for the invention is only a typical one with which the invention may be utilized. A motorcycle is chosen at the exemplary embodiment because the invention, as should be apparent from the foregoing description, has particular utility in conjunction with relatively small, low production volume engines. However, it should also be apparent that the simplicity of the invention lends itself to use with other applications such as automotive application due to the improvement in performance without significant cost penalties.

The motorcycle 51 is comprised of a frame assembly, indicated generally by the reference numeral 52, that dirigibly supports a front wheel 53 on a front fork 54 that is steered by a handle bar assembly 55 in a well-known manner.

A rear wheel 56 is supported for suspension movement relative to the frame 52 by means that includes a trailing arm assembly 57. An engine, indicated generally by the reference numeral 58, and having a combined crankcase transmission assembly 59 is suitably suspended in the frame 52 and drives the rear wheel 56 through a suitable drive arrangement.

The engine 58 has a throttle body 61 that controls the air flow to the engine 58. A throttle valve is associated with this throttle body 61 and is operated by a twist grip throttle control 62 mounted on the handle bar 55. With conventional systems, but not necessary with this invention, a throttle position sensor 63 is associated with the throttle valve shaft of this throttle valve.

As with the prior art constructions as previously described, a fuel injection system including the fuel injector 21 and fuel supply system 23 that includes a fuel tank 64 is provided for supplying a fuel charge to the engine 58. The fuel injector 21 may be of the manifold or direct injection type. The engine 58 is provided with one or more spark plugs 65 (FIG. 3) that are fired by any desired type of ignition system.

The combustion gases are discharged from the engine exhaust port through an exhaust pipe 66 and muffler 67, which has an atmospheric discharge.

The engine 58 in accordance with the illustrated embodiment operates on the four stroke principal, but as will become apparent to those skilled in the art, the invention can also be utilized with two cycle engines.

A seat 68 is positioned on the frame assembly 52 to the rear of the fuel tank 64 for accommodating the rider in a well-known manner.

Figure 3:
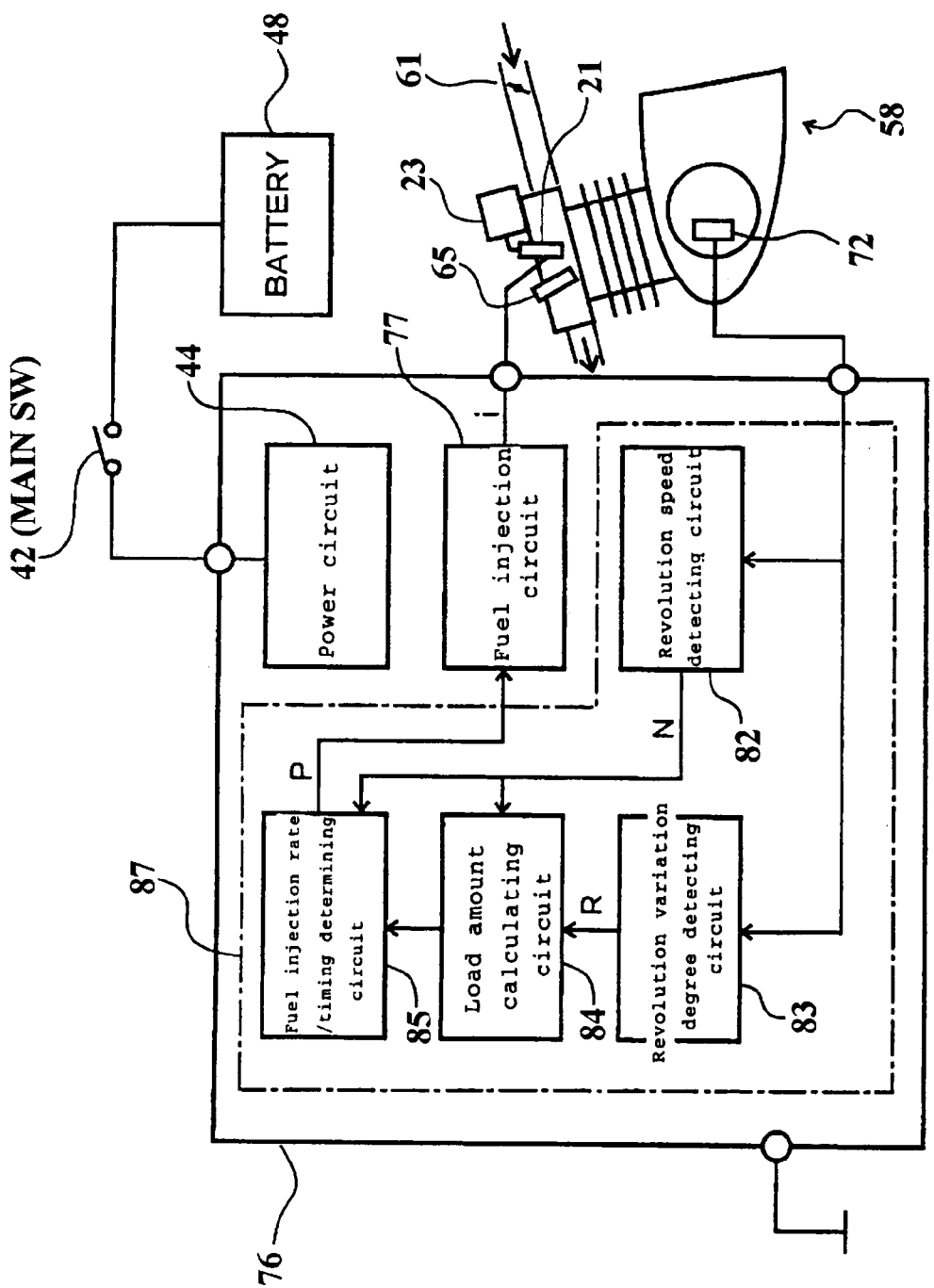
FIG. 3 is a schematic view, in part similar to FIG. 1, but shows the construction in accordance with an embodiment of the invention.
Figure 4:
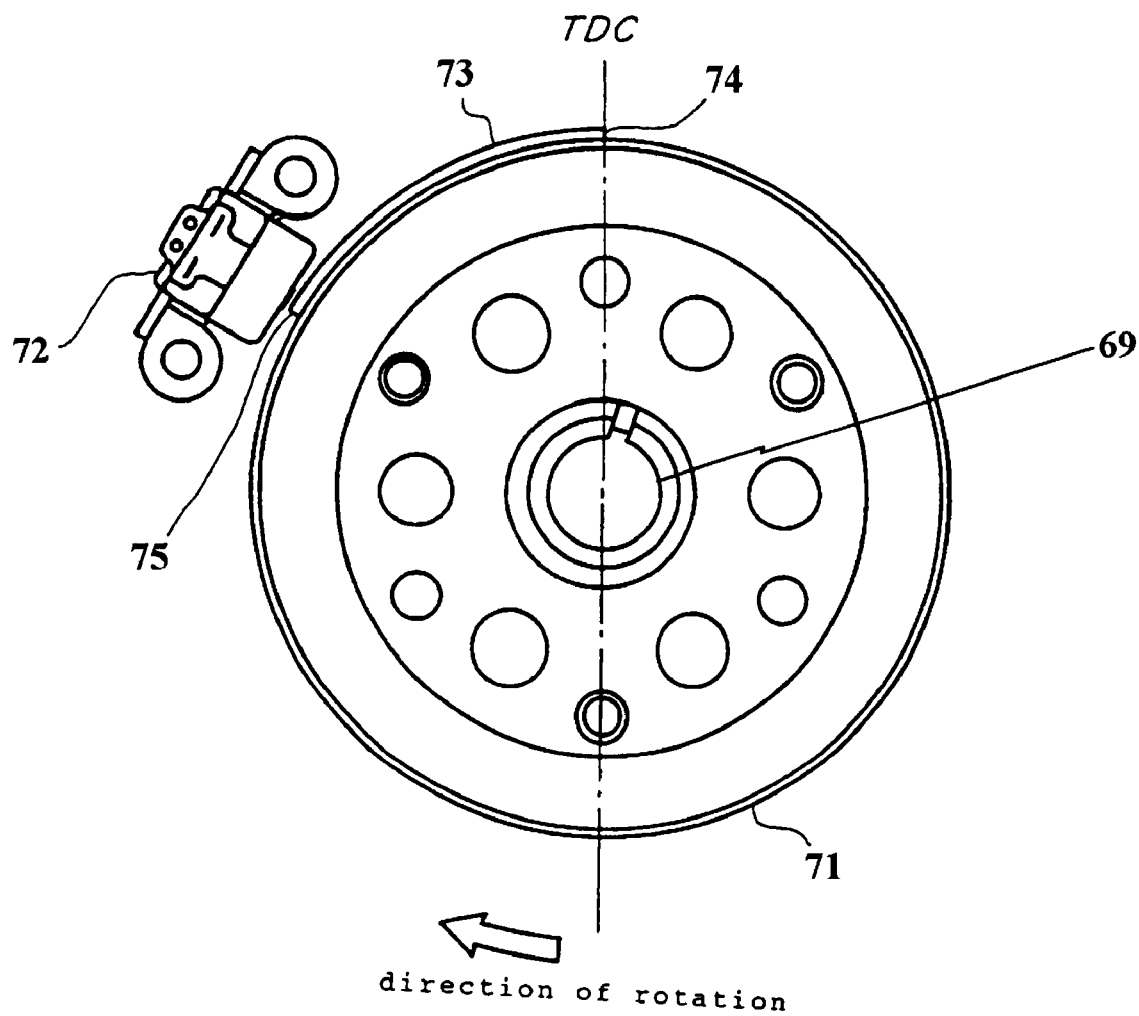
FIG. 4 is a view showing the timing sensor associated with the engine shaft for the fuel injection control system.

Referring now primarily to FIGS. 3 and 4, the control system for controlling the engine fuel injection system and specifically the operation of the fuel injector 21 will be described in more detail. The engine 58 has a crankshaft 69 to which a flywheel 71 is affixed for rotation in a known manner. Although the invention is depicted in association with a crankshaft positioned sensor, it may be associated with any other shaft that is driven by the engine in timed relation.

A pulser type sensor 72 is associated with the flywheel 71 and specifically with a timing mark 73 affixed to its outer peripheral surface. The timing mark 73 has a leading edge 74 and a trailing edge 75 which, when passing the sensor 72 will output pulses that can be measured so as to measure the time it takes the timing mark 73 to pass the sensor 72. This constitutes an instantaneous rotational speed for the engine 58 during a portion of a complete rotation.

The timing mark 73 is considerably wider, in accordance with the invention, than those normally used. Such widening is not necessarily required, but can improve the control. For example the width of the mark 73 may be equal to 60° of crankshaft rotation. The timing mark is set so that it will first trigger a pulse as the engine begins to approach top dead center (TDC) position and another pulse after the crankshaft is at or near top dead center. The specific angles may vary depending upon the particular application.

Nevertheless, because of the four-stroke operation, these pulses are generated at the end of the compression and exhaust strokes. Prior art methods may have utilized speed measurements during the power stroke, but it has been found that the compression and exhaust stroke are much more accurate in providing an indication of engine load and this constitutes one of the features of the invention.

With a two cycle engine the two measurements per revolution will provide adequate information for engine control on the next revolution.

As seen in FIG. 3, the output from the sensor 72 is delivered to an engine fuel injection system control device 76, which contains a fuel injection circuit 77 that can be basically a conventional system, which outputs a signal, "i" to the fuel injector 21 for controlling the time of initiation of injection as well as the amount of fuel injected in a known manner.

This engine fuel injection control system 76 is powered with electrical power from a battery 79 through a main switch 81.

The output from the sensor 72 is transmitted to a rotational speed detection circuit 82, which outputs a signal N indicative of the rotational speed of the engine during each complete revolution cycle. In addition, the outputs from the leading and trailing edges 74 and 75 of the timing mark 73 registered on the sensor 72 are transmitted to a degree of rotational variation detector circuit 83. This circuit 83 outputs a signal "R" indicative of the speed difference to a load calculation circuit 84.

In the described embodiment, the flywheel 71 may be formed of a magnetic material, and the sensor or coil 72 faces the rotational locus of the timing mark 73. In this case, opposite ends of the timing mark 73 are detected from changes in magnetic resistance in the magnetic path passing through the iron core of the coil 72. Alternatively the timing mark 73 may be formed from permanent magnets fixed on the flywheel 71 at positions a given angle away from each other, and the sensor may be a magnetic sensor such as a Hall element for detecting passage of the permanent magnets. Alternatively, the mark may be a slit, which may be detected optically with an LED and a light receiving element.

Figure 6:
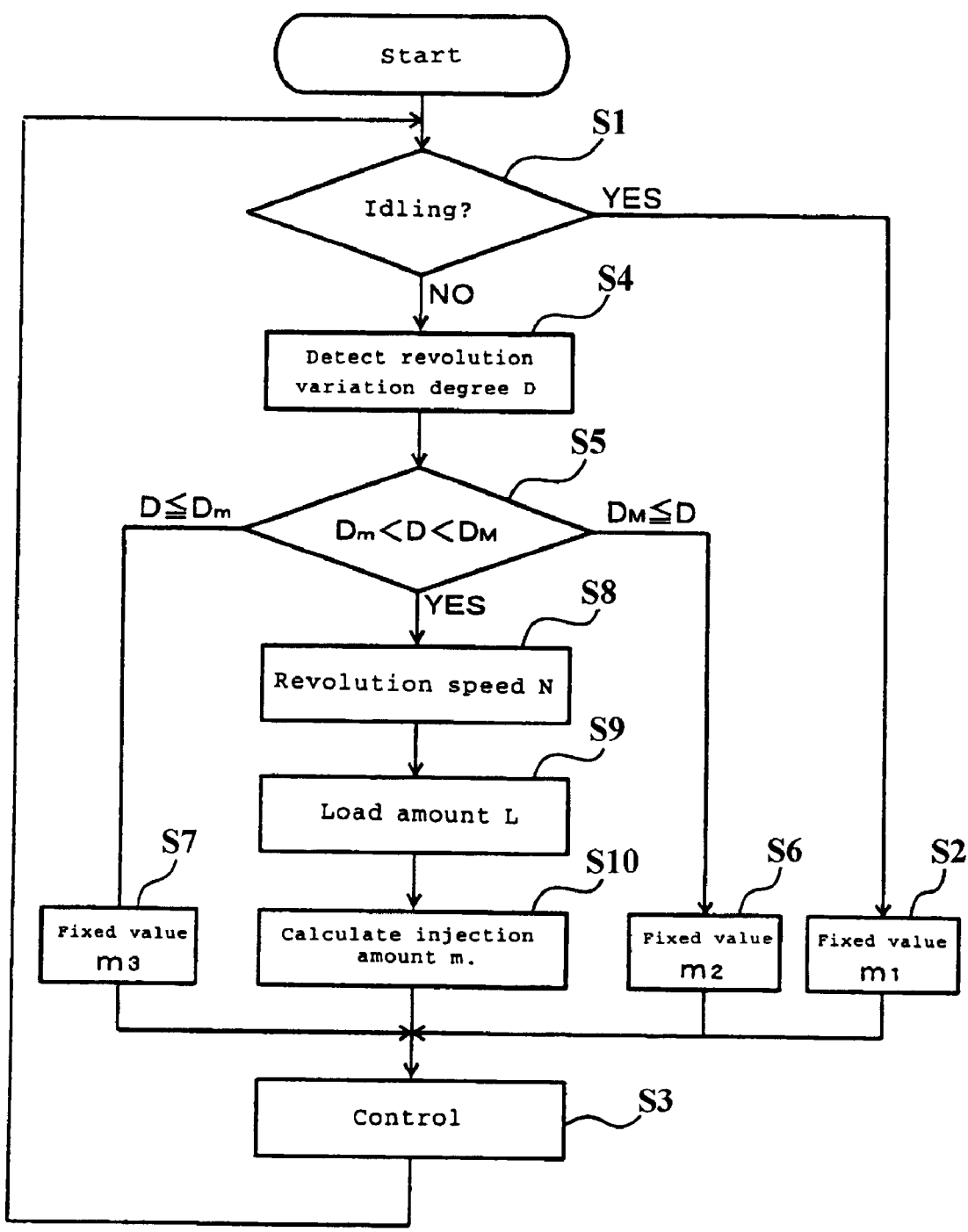
FIG. 6 is a block diagram showing a control routine, which may be utilized to practice the invention.
Figure 7:
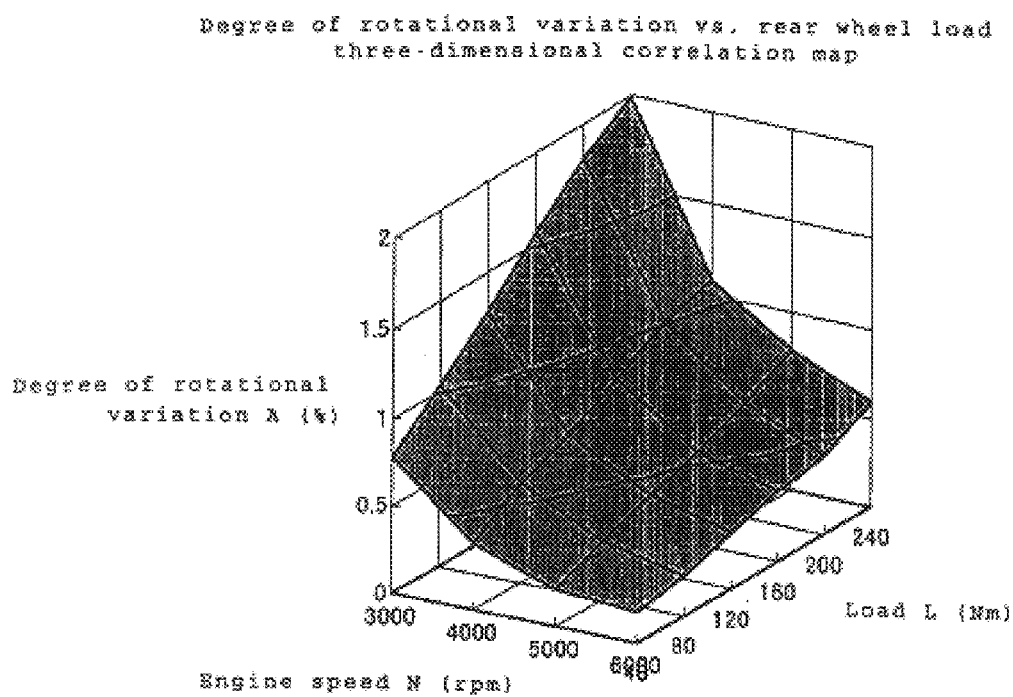
FIG. 7 is an enlarged view of the load determination portion of the diagram of FIG. 5.

The load calculating output circuit operates so as to determine a load factor that is derived from as map shown in FIG. 7. This output is delivered to an injection timing and rate determination circuit 85 which operates in accordance with the control routine shown in FIGS. 5 and 6 so as to output a signal P to the fuel injection circuit 77 for operating the fuel injector 65 at the appropriate time and duration for the engine speed and engine load.

The circuit portions 82, 83, 84 and 85 are all located within a CPU 86 of the engine fuel injection control system 76.

Figure 5:
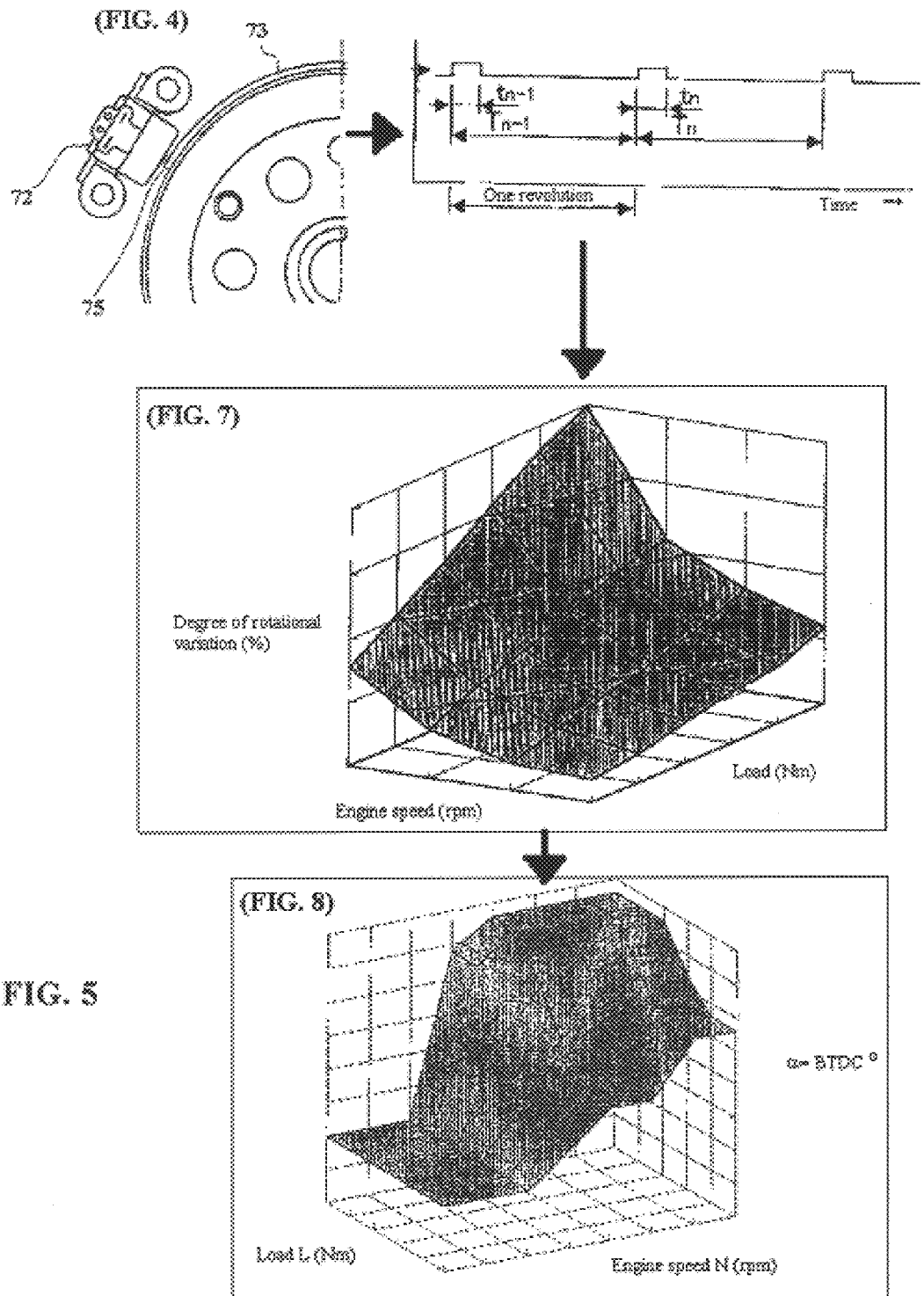
FIG. 5 is a schematic view showing the method of practicing the invention.

Referring now primarily to FIG. 5 and later to FIG. 6, the basic control method used in connection with the invention is to measure revolution to revolution changes in speed "R" will be described. From that difference it is possible to determine engine load. Then by consulting a map of injection control timing and duration, the appropriate fuel injection control can be determined.

FIG. 5 shows schematically how the output from the rotational sensor, in the specific example the coil 72 outputs its signal to the circuit portions 82 and 83 to determine the degree of rotational variation R. A first method to determine the degree of rotational variation R is one in which a ratio of detection time "t" of the projection rotation during a portion of a complete revolution to the period T for a complete rotation including that of the time period t. From these two measurements a ratio is determined and the ratio $(t/T) \equiv R$ is defined as a degree of rotational variation. This method permits adjustment of the engine fuel injection control on the very next rotation. This method can be used with both two and four cycle engines.

A second method to determine the degree of rotational variation R is one in which ratios (t/T) determined by the first method are determined for both the compression and the exhaust stroke (ie. two crankshaft rotations). This method is preferably used in four cycle engines. Then the difference between the ratios is defined as a degree of variation. That is, the difference $(R_{n-1}-R_n)=D$ between a ratio $(t_{n-1}/T_{n-1})=R_{n-1}$ for the compression stroke and a ratio $(t_n/T_n)=R_n$ for the exhaust stroke are determined for each compression or exhaust stroke. The difference D is determined as a degree of variation. These methods are shown in the upper right hand box of FIG. 5.

Figure 9:
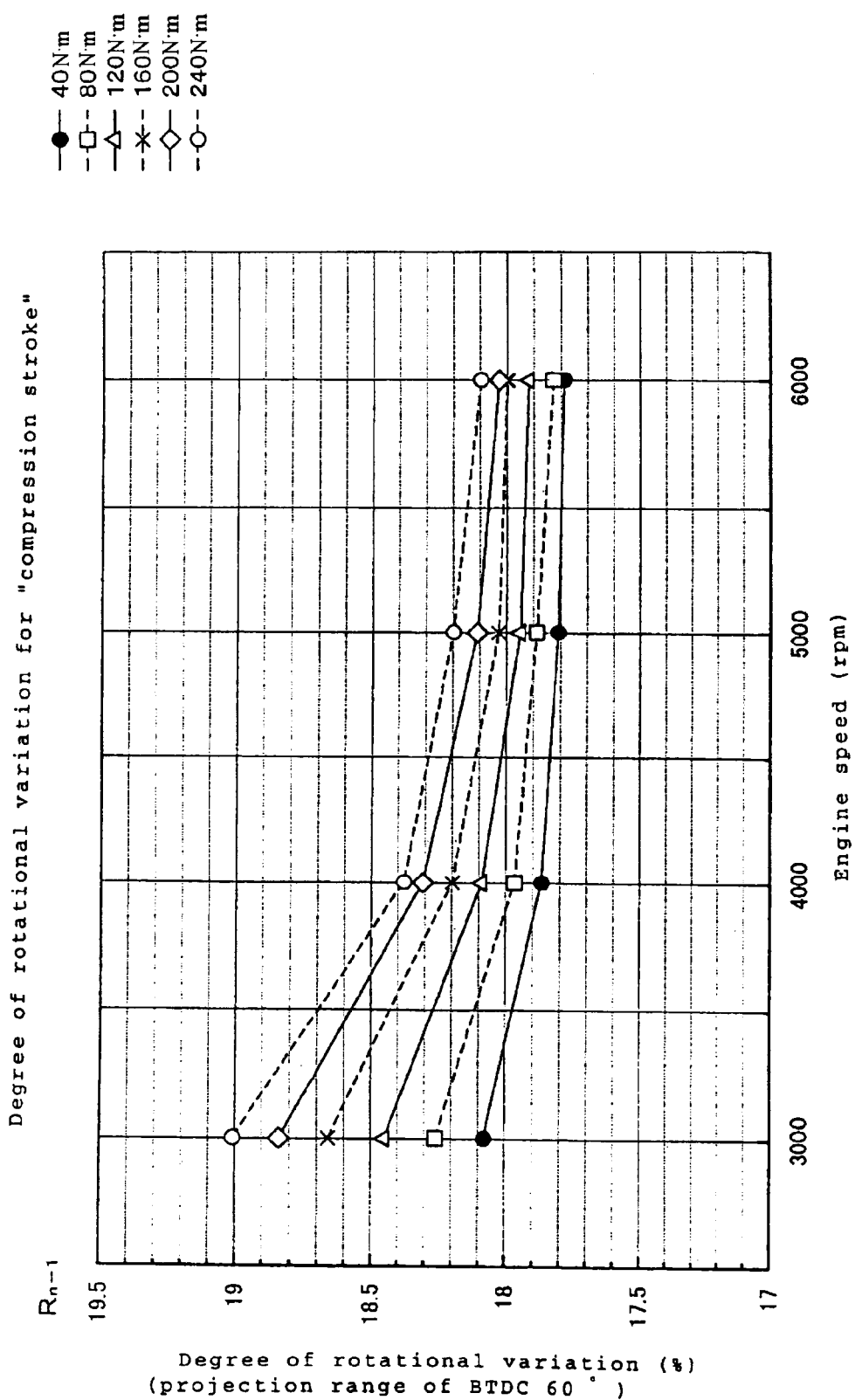
FIG. 9 is a graphical view showing how the shaft speed varies during the compression stroke with engine speed and load.

FIG. 9 shows the ratio $R_{n-1}=(t_{n-1}/T_{n-1})$ for the compression stroke in % at varying torques or loading at 40, 80, 120, 160 200 and 240 Newton meters (N-m). For example, if there is no rotational variation, (60°/360°)=0.167 and thus, the ratio is 16.7%. However, the rotational speed of the crankshaft drops on the compression stroke near Top Dead Center (TDC), so that the ratio $R_{n-1}$ becomes large. As seen in FIG. 9, the ratio $R_{n-1}$ and the rotational variation is larger for a smaller engine speeds N and decreases as N increases. Also as the load or torque increases, the curves shift upwardly because the variation increases.

Figure 10:
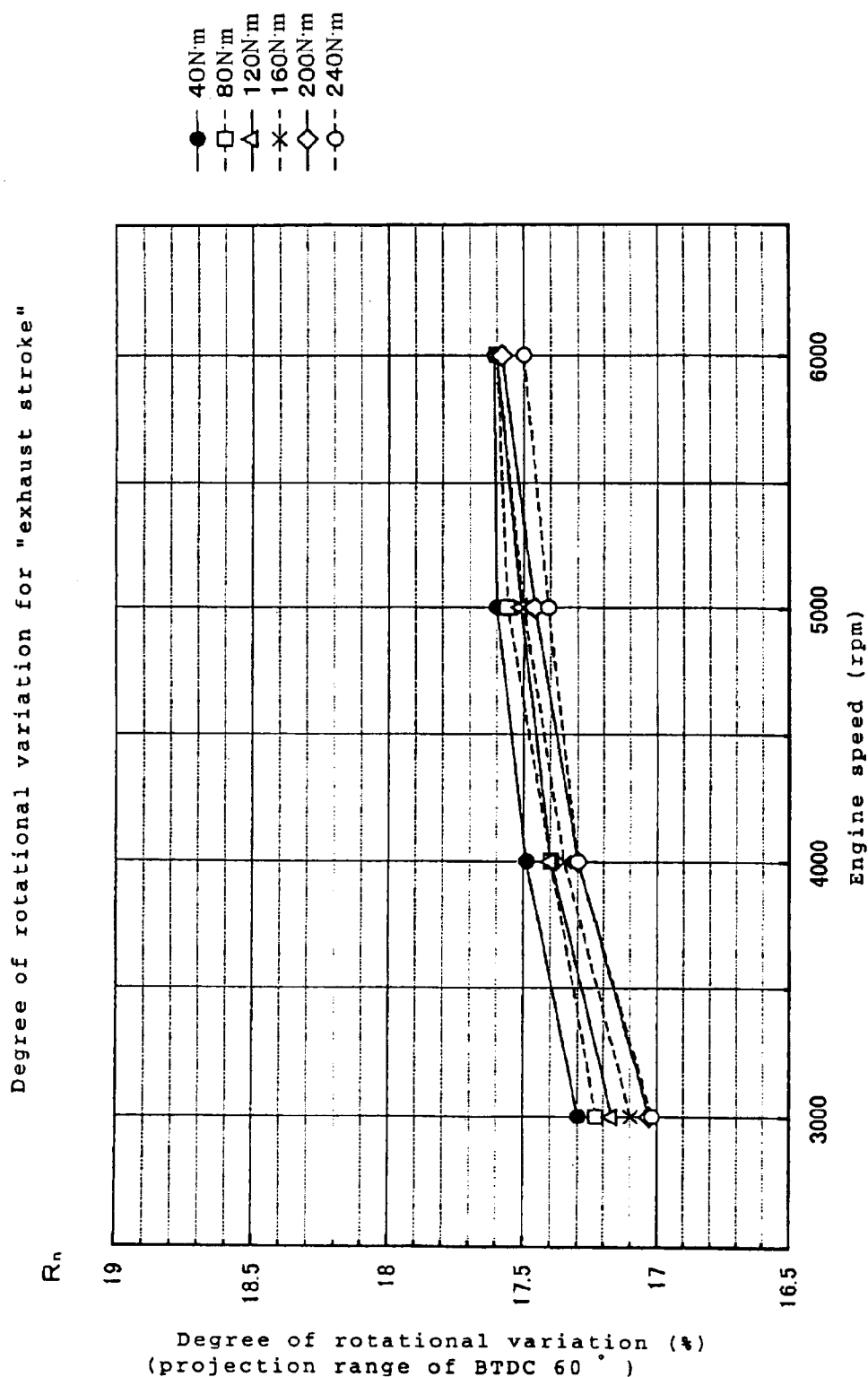
FIG. 10 shows the same condition but on the exhaust stroke.

FIG. 10 shows the ratio $R_n=(t_n/T_n)$ for the exhaust stroke in % where an opposite condition prevails. That is rotational variation is smaller for a smaller engine speeds N and increases as N increases. Also, as the load or torque decreases, the curves shift downwardly because the variation decreases.

Figure 11:
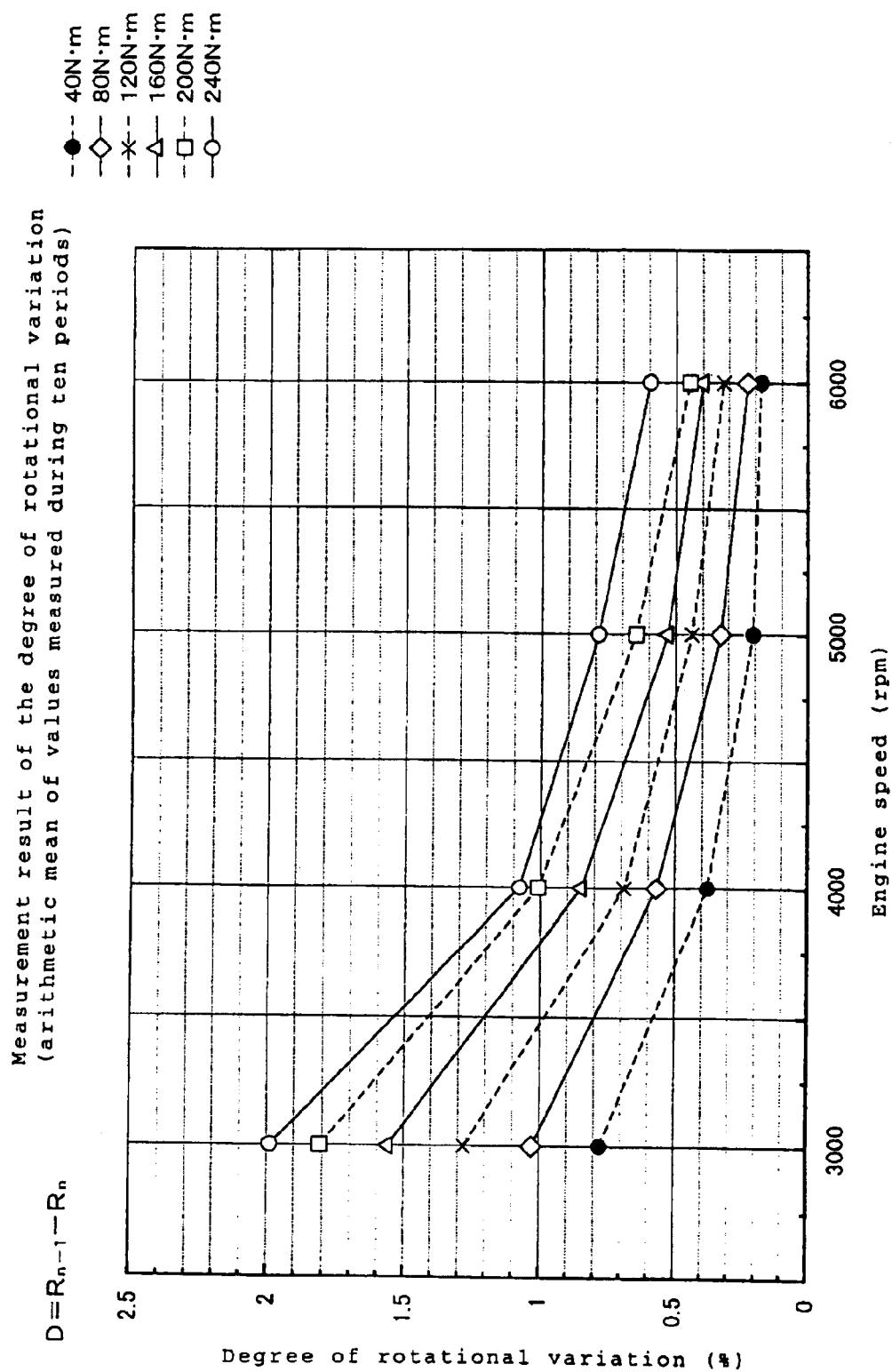
FIG. 11 is a graphical view showing the difference between the speed variations on the compression and exhaust strokes.

FIG. 11 shows the difference $D=(R_{n-1}-R_n)$ between the ratio $R_{n-1}$ for the compression stroke and the ratio $R_n$ for the exhaust stroke, using FIG. 9 and FIG. 10. Here, values of the rotational variation for every cycle measured during ten periods are averaged to improve the stability of the data. The degree-of-rotational variation detection circuit 83 repeats the foregoing calculation in synchronization with the crankshaft rotation.

The characteristics shown in FIG. 11 are measured on the engine in advance and stored in a memory of the microcomputer 76. They are stored, for example, as a three-dimensional conversion map shown in FIG. 7. The load calculation circuit 84 determines load (load Nm on the rear wheel) from the conversion map in FIG. 7, using the degree of rotational variation D determined by the degree-of-rotational variation detection circuit 83, and engine speed N. This determination is shown in the middle right hand box in FIG. 5.

Figure 8:
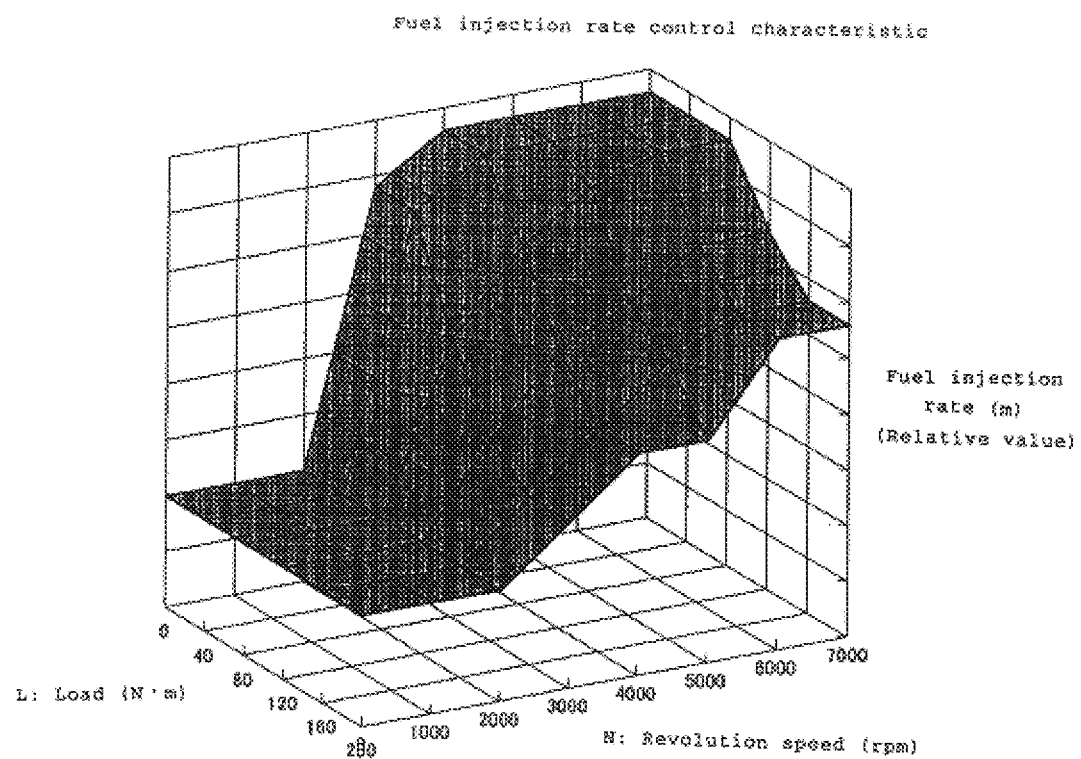
FIG. 8 is a graphical view showing the three-dimensional map utilized to determine the engine injection control with respect to engine load and engine speed in FIG. 5.

Stored in advance in a memory of the microcomputer 76 is the three dimensional map shown in FIG. 8, depending on the specific engine. This map shows the relation between load L, engine speed N and injection amount "m". The injection timing and rate determination circuit 85 determines injection amount m from the map in FIG. 8, using load L and engine speed N determined by the load calculation circuit 84. Injection timing is determined in a similar manner. An injection signal P corresponding to the injection timing and amount is sent to the injection circuit 77. As already noted, the injection circuit 77 causes the fuel injector to inject. This is shown in the lower right hand box of FIG. 5.

A preferred operation of this embodiment will be described with reference to FIG. 6. First, if at the Step S1 it is determined that the engine is running in an idling state, as it will immediately after a warm start up, injection amount m is set to a fixed value m1 at the step S2 and injection control is performed at the step S3. The program then repeats to the step S1.

If the engine 58 is found not to be in an idling state at the step S1, the degree-of-rotational variation detection circuit 83 detects the degree of rotational variation D at the step S4. The microcomputer in the electronic circuit 36 determines whether or not the degree of variation D is within a given range of $D_m$ to $D_M$ at the step S5. If the variation is out of this range, the injection amount is set to a fixed value m2 or m3 at either the step S6 or S7.

The fixed values of m1, m2 and m3 are set to avoid errors under small deviations in D to avoid the effects of electrical noise.

If within this range of $D_M$–$D_m$, the load calculation circuit 84 determines load L using engine speed N determined by the rotational speed detection circuit 82 at the step S8 and looking up the load L from the conversion map of FIG. 7 at the step S9.

The fuel injection determination circuit 85 then determines injection amount m at the step S10 using this load L and engine speed N and looking up this value from the conversion map in FIG. 8. The fuel injection determination circuit 85 then sends an ignition signal P corresponding to the read fuel injection amount m to the fuel injector 65 to be operated at the step S3.

As has been noted, the timing of fuel injection initiation can be determined in a like manner.

Thus, from the foregoing description should be readily apparent that the described method and structure provides a very simple and low cost yet highly effective system for controlling an engine fuel injection system. Also, the system is capable of being used with either two or four cycle engines. Of course, further changes and modifications may be made without departing from the spirit and scope of the invention, as defined by the appended claims.

What is claimed is:

1. A fuel injection control system for an internal combustion engine system said engine having a driven shaft, a sensor arrangement associated with said driven shaft for sensing the instantaneous rotational speed of said driven shaft during the rotation of said driven shaft for less than a complete rotation and for sensing the rotational speed of said driven shaft for a complete revolution thereof including the measured less than a complete rotation, and controlling said engine fuel injection system from these measurements.

2. An internal combustion engine as set forth in claim 1 wherein the sensor arrangement comprises a single sensor.

3. An internal combustion engine as set forth in claim 2 wherein the fuel injection control system is operated solely in response to the sensed rotational speed condition without any other sensor inputs.

4. An internal combustion engine as set forth in claim 1 wherein the engine fuel injection initiation timing is controlled.

5. An internal combustion engine as set forth in claim 1 wherein the duration of engine fuel injection is controlled.

6. An internal combustion engine as set forth in claim 5 wherein the engine fuel injection initiation timing is also controlled.

7. An internal combustion engine as set forth in claim 6 wherein the sensor arrangement cooperates with only a single timing mark on the driven shaft.

8. An internal combustion engine as set forth in claim 7 wherein the single timing mark has a circumferential extent greater than 5°.

9. An internal combustion engine as set forth in claim 8 wherein the sensor arrangement comprises a single sensor.

10. An internal combustion engine as set forth in claim 9 wherein the fuel injection control system is operated solely in response to the sensed rotational speed condition without any other sensor inputs.

11. An internal combustion engine as set forth in claim 10 wherein the fuel injection control measures the time taken for the less than a complete revolution (t) and the time (T) for the complete revolution to determine the ratio t/T and estimates the engine load therefrom.

12. An internal combustion engine as set forth in claim 10 wherein the engine fuel injection initiation timing is controlled.

13. An internal combustion engine as set forth in claim 10 wherein the duration of engine fuel injection is controlled.

14. An internal combustion engine as set forth in claim 13 wherein the engine fuel injection initiation timing is also controlled.

15. An internal combustion engine as set forth in claim 1 wherein the sensor senses the two rotational speeds of said driven shaft during a first rotation of said driven shaft and senses the same two rotational speeds of said driven shaft during the immediately succeeding rotation of said driven shaft and controls said engine fuel injection system on the third rotation of said driven shaft from these measurements.

16. An internal combustion engine as set forth in claim 15 wherein the control measures the time taken for the less than a complete revolution (t) and the time (T) for the complete revolution to determine the ratio t/T during each successive rotation, determines the difference (D) between the two ratios and estimates the engine load therefrom.

17. An internal combustion engine as set forth in claim 16 wherein the engine fuel injection initiation timing is controlled.

18. An internal combustion engine as set forth in claim 16 wherein the duration of engine fuel injection is controlled.

19. An internal combustion engine as set forth in claim 18 wherein the engine fuel injection initiation timing is also controlled.

20. An internal combustion engine as set forth in claim 18 wherein the control sets a fixed value for the fuel injection duration if the engine speed is less than a predetermined value.

21. An internal combustion engine as set forth in claim 20 wherein the predetermined value of the engine speed is a normal idle speed.

22. An internal combustion engine as set forth in claim 20 wherein the control sets a fixed value for the engine system if the value of D is greater than a predetermined value.

23. An internal combustion engine as set forth in claim 18 wherein the control sets a fixed value for the fuel injection duration if the value of D is less than a predetermined value.

24. An internal combustion engine as set forth in claim 20 wherein the control sets a different fixed value for the fuel injection duration if the engine speed is greater than a predetermined value.

25. An internal combustion engine as set forth in claim 22 wherein the control sets a still further different fixed value for the fuel injection duration if the value of D is less than a predetermined value.

26. An internal combustion engine as set forth in claim 18 wherein the fuel injection control is determined using a conversion map for determining engine load based on the value of D and rotational speed of the engine shaft and a conversion map for determining engine control based on engine load and rotational speed of said engine shaft.

27. An internal combustion engine as set forth in claim 18 wherein the engine operates on a four cycle principle and one of the speed sensings is done on a compression cycle and the other is done on an exhaust cycle.

28. An internal combustion engine as set forth in claim 21 wherein the engine is spark ignited and the engine system controlled comprises at least the spark timing.

29. A four cycle internal combustion engine for controlling a fuel injection system of the engine wherein the engine has a driven shaft, a sensor arrangement associated with said driven shaft for sensing the rotational speed of said driven shaft, said control measuring the rotational speed of said driven shaft during a revolution containing a compression stroke and measuring the rotational speed of said driven shaft during a revolution containing an exhaust stroke and controlling said fuel injection system from these measurements.

30. An internal combustion engine as set forth in claim 29 wherein the control system operated solely in response to the sensed rotational speed conditions without any other sensor inputs.

31. An internal combustion engine as set forth in claim 29 wherein the sensor arrangement comprises a single sensor.

32. An internal combustion engine as set forth in claim 31 wherein the control measures the time taken for the less than a complete revolution (t) and the time (T) for the complete revolution to determine the ratio t/T during each of two successive rotations the engine load therefrom.

33. An internal combustion engine as set forth in claim 29 wherein the fuel injection system control is determined using a conversion map for determining engine load based on the value of the difference between the two measured ratios and rotational speed of the engine shaft and a conversion map for determining engine control based on engine load and rotational speed of said engine shaft.

34. An internal combustion engine for controlling a fuel injection system of said engine wherein the engine has a driven shaft, a sensor arrangement associated with said driven shaft for sensing two rotational conditions of said driven shaft during a first rotation of said driven shaft and for sensing same two rotational conditions of said driven shaft during the immediately succeeding rotation of said driven shaft and controlling said engine system on the third rotation of said driven shaft from these measurements.

* * * * *